(12) United States Patent
Niznick

(10) Patent No.: US 12,156,780 B2
(45) Date of Patent: Dec. 3, 2024

(54) DUAL FUNCTION DENTAL IMPLANTS

(71) Applicant: Gerald A Niznick, Las Vegas, NV (US)

(72) Inventor: Gerald A Niznick, Las Vegas, NV (US)

( * ) Notice: Subject to any disclaimer, the term of this patent is extended or adjusted under 35 U.S.C. 154(b) by 132 days.

(21) Appl. No.: 18/130,602

(22) Filed: Apr. 4, 2023

(65) Prior Publication Data

US 2024/0335261 A1 Oct. 10, 2024

(51) Int. Cl.
*A61C 8/00* (2006.01)

(52) U.S. Cl.
CPC ............................... *A61C 8/0022* (2013.01)

(58) Field of Classification Search
CPC ....... A61C 8/0022; A61C 8/0018; A61C 8/00; A61C 8/0048; A61C 8/006; A61C 8/0069; A61C 8/0062; A61C 8/0074; A61C 8/0025; A61C 8/005; A61C 8/0095; A61C 8/0057; A61C 8/0016; A61C 8/008; A61C 8/0059; A61C 8/0051; A61C 8/0075; A61C 8/0098; A61C 13/2656; A61C 13/265; A61C 5/30
USPC ....................................... 433/174–176, 201.1
See application file for complete search history.

(56) References Cited

U.S. PATENT DOCUMENTS

| | | | |
|---|---|---|---|
| 9,456,881 B1 * | 10/2016 | Niznick | A61C 8/0053 |
| 2002/0110784 A1 * | 8/2002 | Kumar | A61C 8/008 |
| | | | 433/172 |

\* cited by examiner

*Primary Examiner* — Ralph A Lewis
*Assistant Examiner* — Mirayda A Aponte
(74) *Attorney, Agent, or Firm* — Patrick F. Bright

(57) ABSTRACT

A screw-type endosseous dental implant includes, near the top on its external surface, a ridge projecting laterally and an internally-threaded shaft with a lead-in, beveled opening, an internal wrench-engaging surface located below the lead-in, beveled opening and below the internal wrench-engaging surface and above the internal threads, an internal undercut/groove creating a chamber formed to receive a snap attachment for retention of an over-denture.

5 Claims, 5 Drawing Sheets

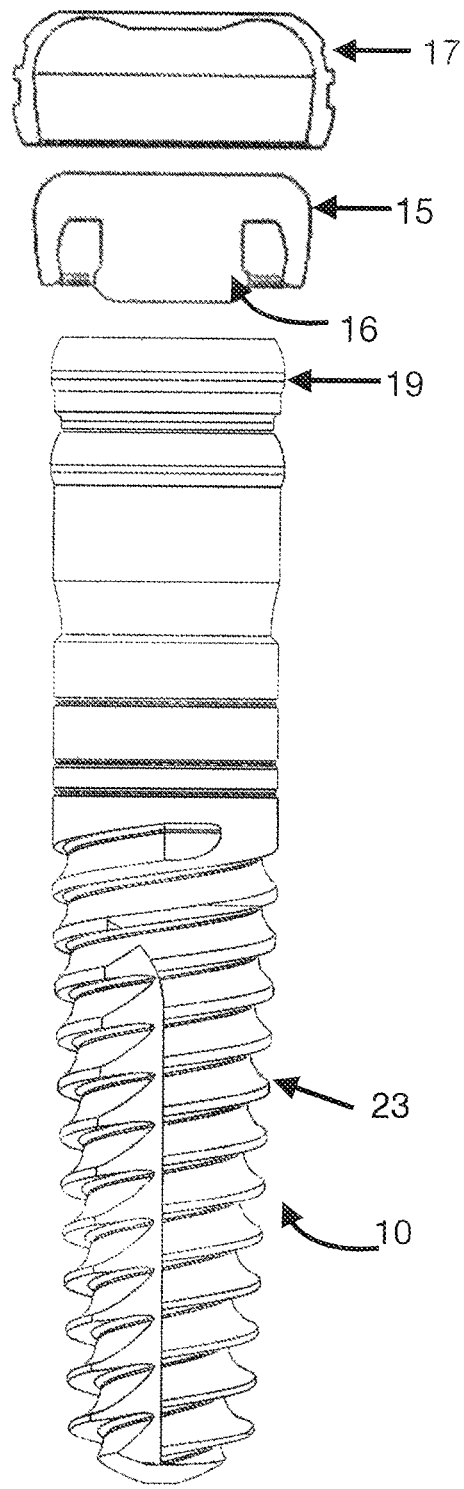
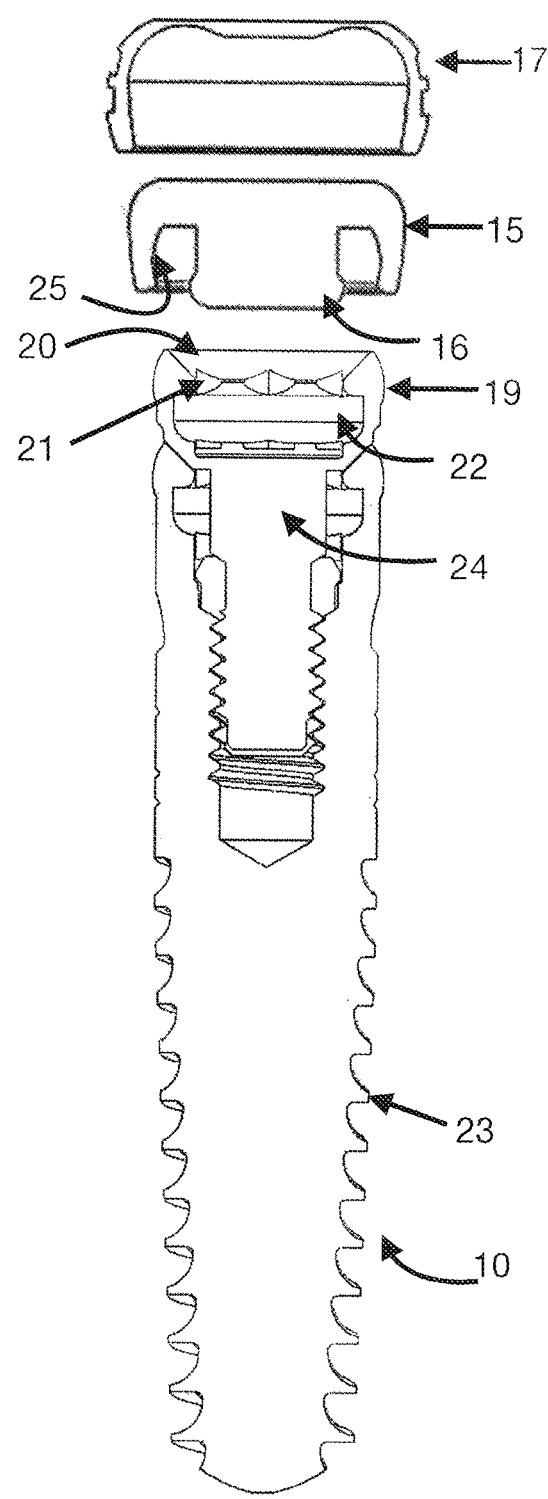
Fig. 7                    Fig. 8

DUAL FUNCTION DENTAL IMPLANTS

A screw-type endosseous dental implant includes, near the top on the implant's external surface, a ridge projecting laterally, and an internally-threaded shaft extending down from the implant's top surface. The internally threaded shaft includes a lead-in bevel at the proximal end of this shaft, and, inside this shaft, an internal wrench-engaging surface that is positioned distal to the lead-in bevel, for inserting the implant into a patient's jawbone. In some embodiments. the internal wrench-engaging surface can be a square, a hex or a plurality of slots.

Distal to the internal wrench-engaging surface is an internal undercut/groove forming a chamber, that is greater in diameter than the opening. The chamber may have a diameter in the range of about 2 mm to about 3 mm, and is configured to receive the distal end of a post that extends downwardly from the underside of a cap that fits over the proximal end of the implant.

The inner surface of the cap snaps over the ridge on the external surface of the implant. The distal end of the post projects down a sufficient length from the cap that its distal portion extends into the chamber and is of sufficient size and shape to snap into the chamber. The magnitude of the difference between the diameter of the end of the post and the diameter of the opening into the chamber will vary, depending on the material used to make the cap and the amount of retention that is desired, preferably ranging from 1 pound. to 6 pounds.

The cap is of sufficient size and shape to fit over the top of the implant and snap into the undercut below the ridge that is on the external surface near the top of the implant. Preferably, the cap is made of a polymer such as nylon, or another plastic material. This cap is configured to be inserted within a metal housing that provides surface retention grooves for attachment to the underside of a denture. This cap can rotate within its metal housing and the cap can rotate on the top of the implant while maintaining its retention to both the outer ridge on the implant and the chamber within the implant's internal shaft. The lead-in bevel provides lateral stability to an abutment that is seated in/on this bevel. In some embodiments, the lead-in bevel may have a degree of taper in the range of about 40 to about 83 degrees, with respect to the longitudinal axis of the implant.

The opening into the shaft is at least about 2.0 mm in diameter, and is sufficiently large to receive a fixation/retention screw of adequate strength to retain a one-piece or two-piece abutment on the implant. This wide diameter opening, which may be up to 2.5 mm in diameter, allows use, with the implant, of an abutment with its own internal shaft, to receive a retention/fixation screw that passes through the internal shaft of the abutment, and that is configured to engage the threads inside the implant. The abument may be configured to engage the wrench-engaging surfaces inside the implant, anti-rotationally. Use of a fixation/retention screw passing through the internal shaft of the abutment permits engagement of the screw's distal threads with the implant's internal threads.

These implants are configured to support overdentures, or, if desired, to receive and support one-piece abutments and two-piece abutments that seat on, and inside the implant's lead-in bevel. These implants can also be configured to receive a two-piece abutment that can be seared in the hex, or other internal wrench-engaging surfaces inside an implant, and retained in place with a retention/fixation screw that passes through an internal shaft in the abutment, and engages threads inside the implant.

These implants preferably include a proximal neck portion that is substantially cylindrical, and externally unthreaded, and an externally-threaded body portion distal to the neck portion. The implants are preferably tapered from their proximal end to their apical end. The implants may have a length in the range of about 6 mm to about 16 mm; a diameter ranging from about 3.2 mm to about 4.7 mm at their widest point, and tapering at 2-9 degrees from the implant's widest diameter.

BRIEF DESCRIPTION OF THE DRAWINGS

The appended drawings illustrate, but do not define or limit the scope of, this invention. The drawings include:

FIG. 7 shows, in vertical elevation, the same first embodiment of the implant shown in FIGS. 1 to 3, here with a first one-piece abutment placed inside the implant, and the cap and cap cover shown in FIGS. 4 to 6, positioned above the implant for placement over the external proximal surface of the abutment, and for concurrent placement inside the opening into the abutment's internally-threaded shaft, of a post that is attached to, and extends downwardly from the underside of the cap;

FIG. 8 shows, in vertical cross section, the same first embodiment of the implant shown in FIGS. 1 to 3, here with a first one-piece abutment placed inside the implant, and the cap and cap cover shown in FIGS. 4 to 6, positioned above the implant for placement over the external proximal surface of the abutment, and for concurrent placement inside the opening into the abutment's internally-threaded shaft, of a post that is attached to, and extends downwardly from the underside of the cap;

DETAILED DESCRIPTION OF THE DRAWINGS

Figures 1, 2, 3:
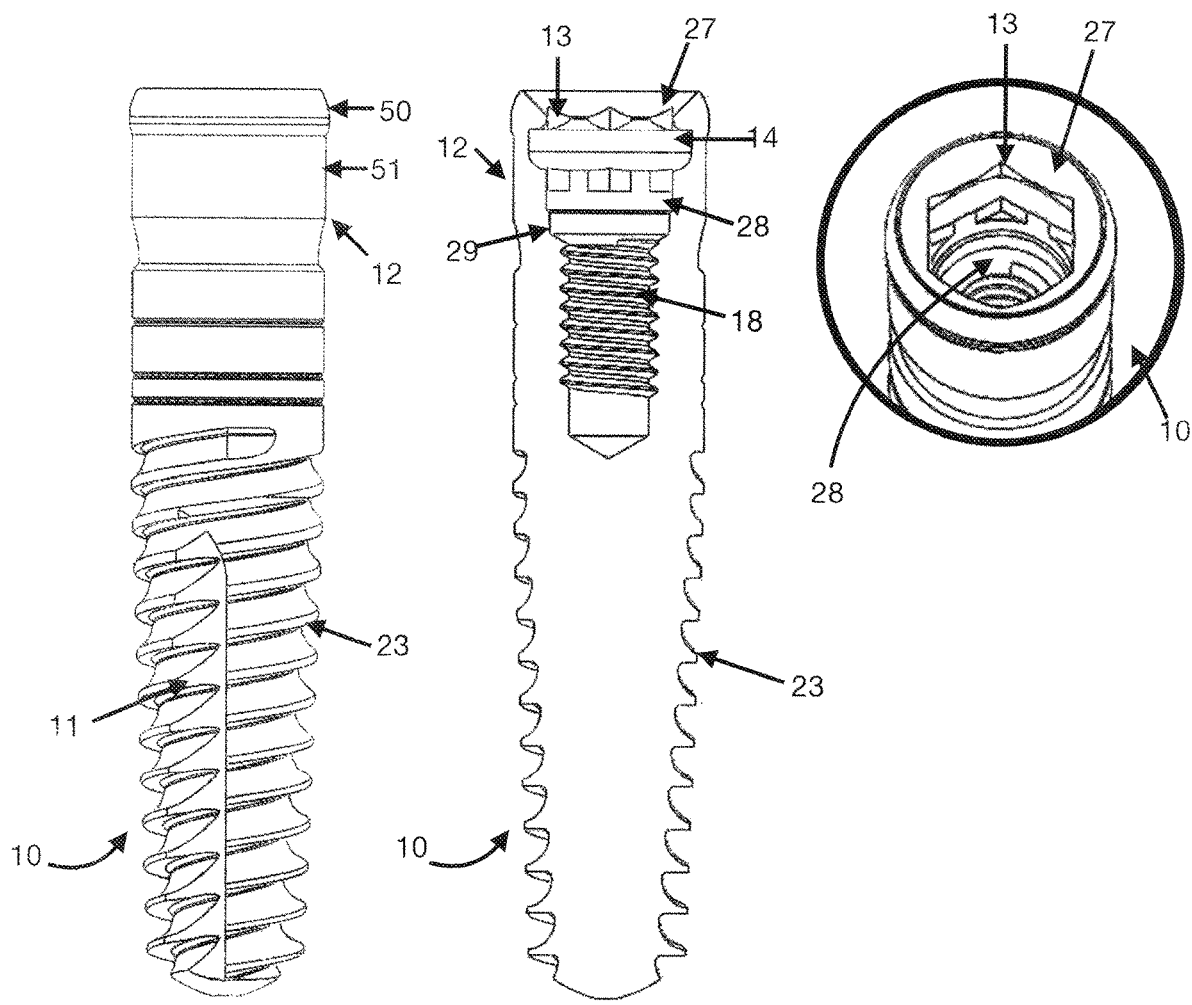
FIG. 1 shows a first embodiment of the implants of this invention, in vertical elevation.
FIG. 2 shows the first embodiment of the implants of this invention in vertical elevation.
FIG. 3 shows the first embodiment of the implants of this invention in exploded, plan perspective.

FIGS. 1, 2, and 3 show endosseous dental implant 10 with external threads 23 and external cutting groove 11 on implant 10's distal portion. Implant 10's smooth neck portion 12, located above externally-threads 23, includes beveled proximal opening 27 to implant 10's internal vertical shaft 28. Inside shaft 28 are distal threaded region 18, and proximal unthreaded region 29. On the external surface 51 of neck portion 12 is laterally-projecting ridge 50, configured to engage the underside of skirt 52 (see FIG. 4) when cap 15 is placed atop implant 10.

Distal to beveled proximal opening 27, and inside shaft 28, are hex-shaped wrench engaging surfaces 13 both above and below chamber 14. Between surfaces 13 is undercut, circumferential groove 14. Groove 14 is larger in diameter than opening 27.

Figures 4, 5, 6:
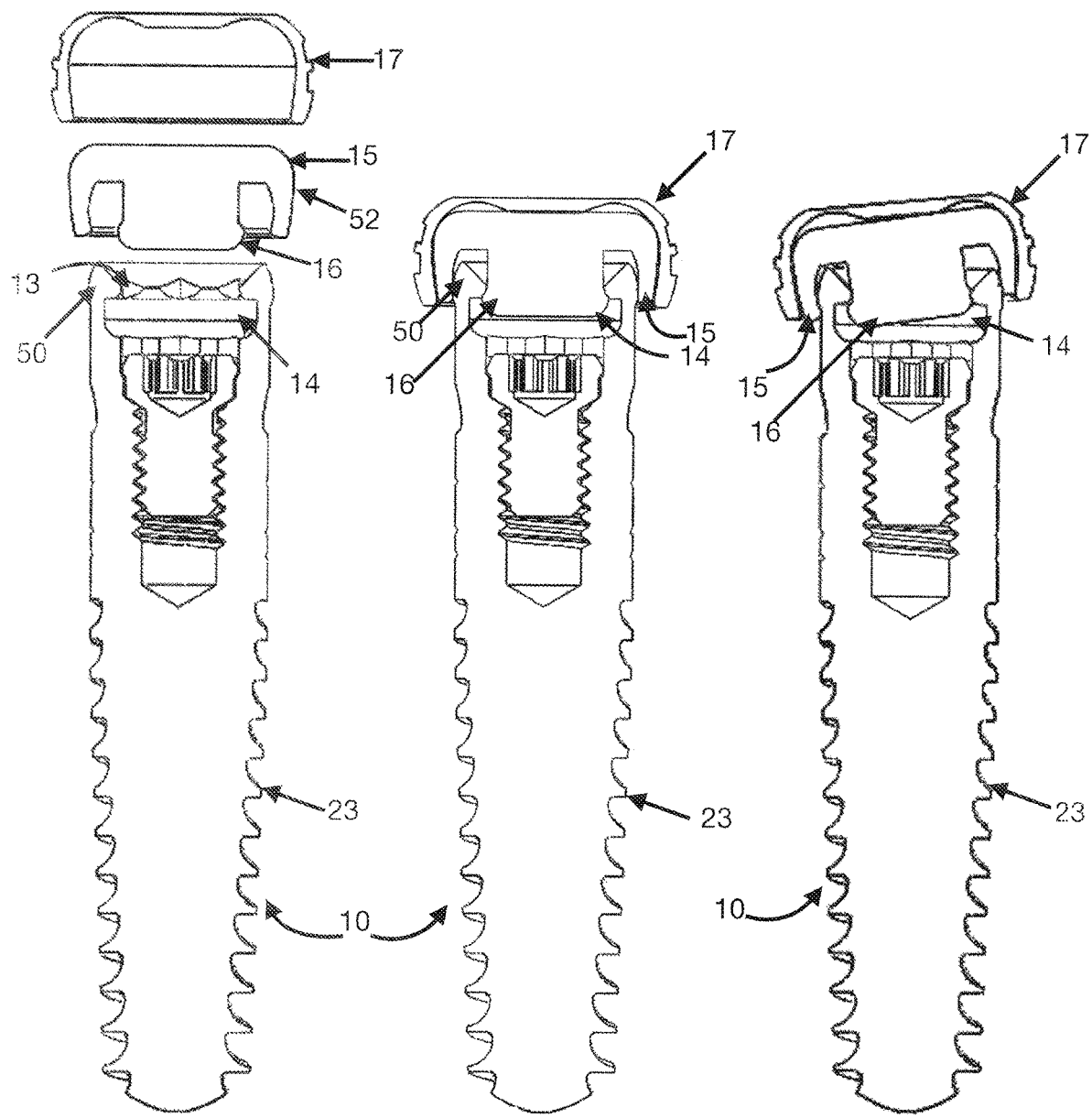
FIG. 4 shows, in vertical cross section, the same first embodiment of the implant shown in FIGS. 1 to 3, here with a cap and cap cover configured for placement over the external proximal surface of the implant, and for concurrent placement inside the opening into the implant's internally-threaded shaft, of a post that is attached to, and extends downwardly from the underside of the cap.
FIG. 5 also shows, in vertical cross section, the same first embodiment of the implant shown in FIGS. 1 to 3, here with a cap and cap cover configured for placement over the external proximal surface of the implant, and for concurrent placement inside the opening into the implant's internally-threaded shaft, of a post that is attached to, and extends downwardly from the underside of the cap.
FIG. 6 also shows, in vertical cross section, the same first embodiment of the implant shown in FIGS. 1 to 3, here with a cap and cap cover configured for placement over the external proximal surface of the implant, and for concurrent placement inside the opening into the implant's internally-threaded shaft, of a post that is attached to, and extends downwardly from the underside of the cap.

FIGS. 4 to 6 show implant 10 in vertical cross section, with plastic cap 15 positioned above implant 10 in FIG. 4. Attached to, and extending downwardly from the underside of cap 15, is post 16. As shown in FIGS. 5 and 6, with cap 15 placed over the proximal end of implant 10, post 16 projects downwardly into shaft 28, and the distal end of post 16 seats in groove 14. Cap cover 17, preferably made of a metal such as --, is placed atop cap 15, as shown in FIGS. 5 and 6.

FIGS. 7 and 8 show implant 10 with abutment 19 inserted into internal shaft 28. As shown in FIG. 8, this abutment has a beveled opening 20 into an internal shaft that includes hex-shaped wrench-engaging surfaces 21. Cap 15 with downwardly extending post 16 is configured to fit into internal shaft 24. When cap 15 is so inserted, the top portion 25 of cap 15 fits over, and covers the top of implant 10, and post 16 fits into groove 22 inside implant 10. Metal cover 17 fits over, and covers the top of cap 15 when placed over cap 15.

Figures 9, 10, 11:
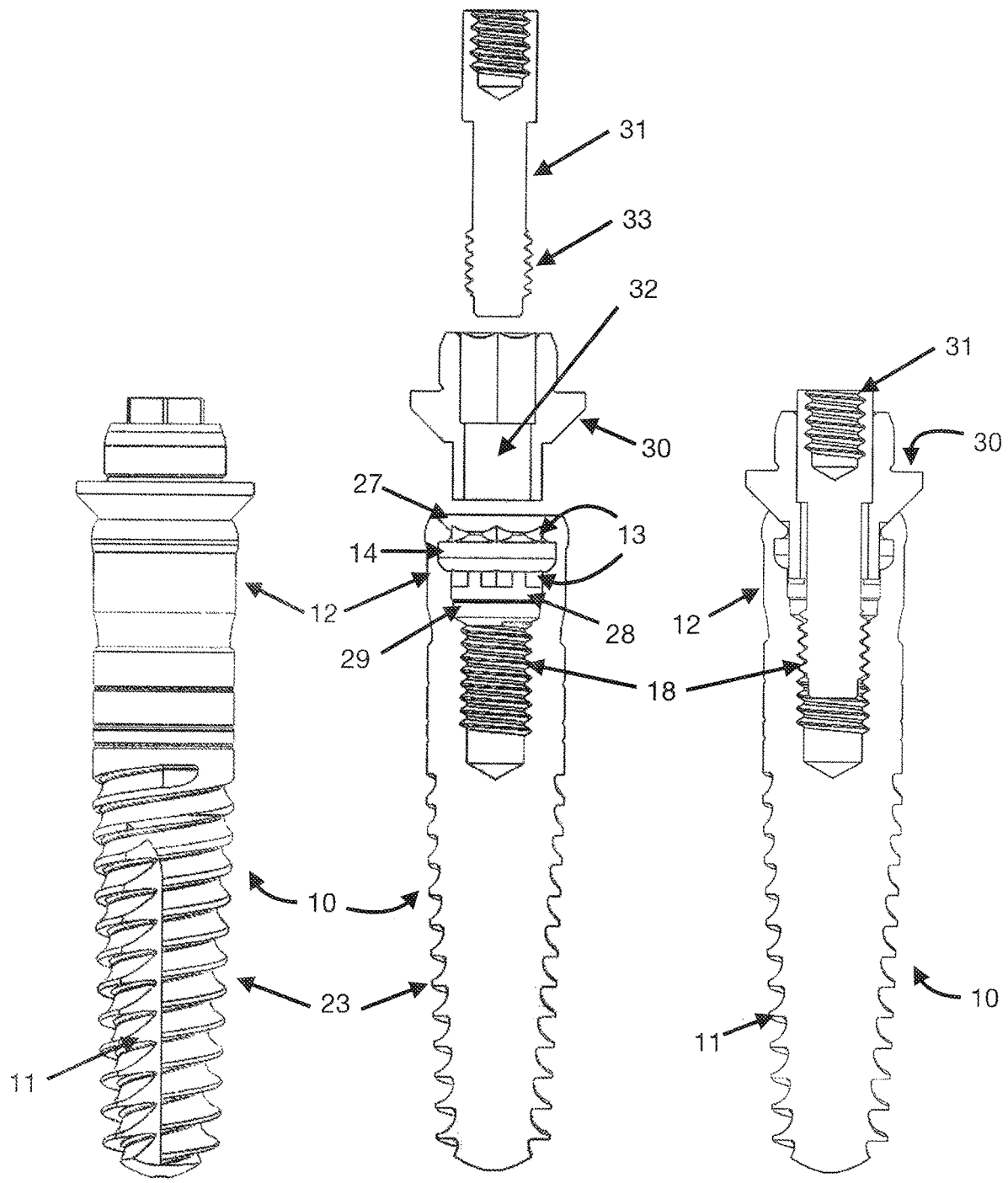
FIG. 9 shows, in vertical elevation, the same first embodiment of the implant shown in FIGS. 1 to 3, here with a two-piece abutment placed inside the implant.
FIG. 10 shows, in vertical cross section, the same first embodiment of the implant shown in FIGS. 1 to 3, here with a two-piece abutment placed inside the implant.
FIG. 11 shows, in vertical cross section, the same first embodiment of the implant shown in FIGS. 1 to 3, here with a two-piece abutment placed inside the implant.

FIGS. 9, 10 and 11 show, in vertical elevation (FIG. 9), and in vertical cross section (FIGS. 19 and 11), dental implant 10, here with a two-piece abutment/retention screw 30/31, placed inside the implant. In FIG. 10, abutment 30 and retention screw 31 are shown above implant 10, positioned for insertion into shaft 28 of implant 10. In FIG. 11, abutment 30 is inserted into shaft 28, and retention screw is inserted into through passage 32 in abutment 31, and its threaded shank 33 is screwed into the internal threads of implant 10.

Figures 12, 13, 14:
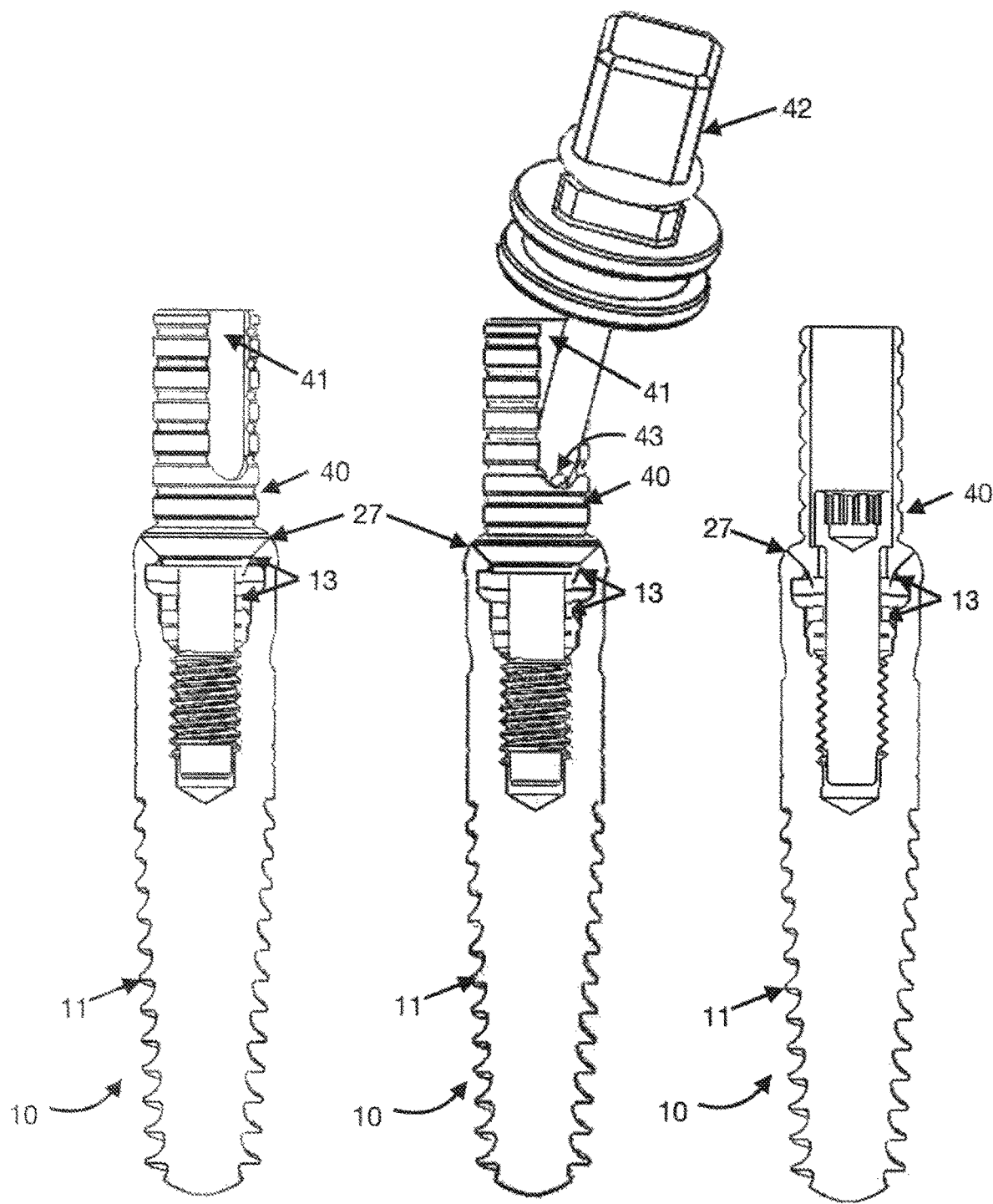
FIG. 12 shows, in vertical cross section, the same first embodiment of the implant shown in FIGS. 1 to 3, here with a one-piece sleeve placed inside the internally-threaded shaft of the implant.
FIG. 13 also shows, in vertical cross section, the same first embodiment of the implant shown in FIGS. 1 to 3, here with a one-piece sleeve placed inside the internally-threaded shaft of the implant.
FIG. 14 also shows, in vertical cross section, the same first embodiment of the implant shown in FIGS. 1 to 3, here with a one-piece sleeve placed inside the internally-threaded shaft of the implant.

FIGS. 12, 13 and 14 show, in vertical cross section, dental implant 10, here with restorative sleeve 40 inserted into shaft 28 of implant 10. Beveled opening 27 into shaft 28 provides strong lateral support to sleeve 40. An open side 41 is formed in restorative sleeve 40 to allow tool 42 with a hexalobular, wrench-engaging, rounded head 43 to access the restorative sleeve 40 at up to a 30 degree angle from the vertical axis of sleeve 40.

Where a range of values is provided, every intervening value, between the upper and lower limit of that range and any other stated or intervening value in that stated range is included within the invention. The upper and lower limits of these smaller ranges may be included in the smaller ranges, and are likewise included within the invention. Where the stated range includes one or both of the limits, ranges excluding either or both of those included limits are also included in the invention In this specification and in the appended claims, the singular forms "a", "and", "said", and "the" include plural referents unless the context clearly dictates otherwise. The claims may be so-drafted to require singular elements or exclude any optional element. These statements provide antecedent basis for use of such exclusive terminology as "solely", "only", and the like in connection with the recitation of claim elements, and/or the use of "negative" claim limitation(s).

While this invention has been described in conjunction with the exemplary embodiments outlined above, the foregoing description of exemplary embodiments of the invention, as set forth above, is illustrative, not limiting. The invention is not necessarily so constrained. Many alternatives, adaptations modifications, and/or variations may be apparent to those skilled in the art.

The invention claimed is:

1. A screw-type endosseous dental implant with a lead-in, beveled opening at the top of said implant into an internal threaded shaft and an internal wrench-engaging surface includes, near the top of said implant, on its external surface, a laterally-projecting ridge for retentive engagement of a cap, and within said internal threaded shaft, an internal chamber that is greater in diameter than the diameter of said opening, and said opening has a diameter of at least 2 mm, and that is configured to retentively engage a post extending downwardly from the undersurface of said cap, said cap formed of suitable flexible material, and configured on its outside surface, to receive a metal cover that provides a site for attachment of said cap to the underside of a denture;

said lead-in, beveled opening into said internal threaded shaft, that provides a laterally stable base for attachment of a screw-retained abutment when said cap is absent, said bevel of said lead-in, beveled opening having a degree of taper in the range of 40 to 83 degrees, with respect to the longitudinal axis of said implant.

2. The implant of claim 1 wherein said internal chamber is configured to receive the distal end of a post that extends downwardly from the underside of a cap that fits retentively into said internal chamber of said implant.

3. The implant of claim 2 wherein said post projects down a sufficient length from said cap that its distal portion extends into said internal chamber and is of sufficient size, shape and material to snap into said internal chamber, and to retain said post in place.

4. The implant of claim 1 wherein said lead-in, beveled opening is sufficiently large to receive a screw of adequate strength to retain a two-piece abutment on said implant.

5. The implant of claim 1 wherein said lead-in, beveled opening is up to 2.5 mm in diameter.

* * * * *